United States Patent Office 3,242,076
Patented Mar. 22, 1966

3,242,076
GLASS BONDED DRY FILM LUBRICANT
Melvin A. Hagan, Palos Verdes Estates, Calif., assignor to North American Aviation, Inc.
No Drawing. Filed May 22, 1963, Ser. No. 282,211
10 Claims. (Cl. 252—26)

The present invention relates to improved dry film lubricants, and more particularly to a dry film lubricant which is capable of service at very high temperatures under heavy loads and wherein all the components have lubricating properties.

Mechanical components in advanced technologies are being required to operate under increasingly higher temperatures for extended periods of time. In modern aircraft, for example, bearings such as plain spherical and journal bearings, as well as low friction ball and roller bearings, must operate under high load at temperatures in the range of 600° F. For such service requirements the conventional oils and greases are unsatisfactory. Among the more promising new lubricants which have been developed for such service are dry film lubricants which generally comprise low shear materials such as graphite and molybdenum disulfide dispersed in organic or inorganic adhesives or vitreous enamels which bond the composition to the bearing surface. The presently commercially available dry lubricants are erratic in performance and exhibit relatively short life and high frictional coefficients. The binders for the lubricating materials presently used are essentially non-lubricating, and consequently their concentration in the lubricant must be held to a minimum, generally about 10–20 weight percent. However, since the binder is needed to maintain adherence of the lubricant to the metal, decreasing its concentration tends to cause the film to flake or spall off the metal during service, thus shortening the life of the bearing.

An object of the present invention, therefore, is to provide an improved dry film lubricant.

Another object is to provide such a composition capable of satisfactory service at elevated temperatures in heavily loaded bearings.

Another object is to provide an improved, long life, high performance, dry film lubricant in which all the lubricant components including a vitreous enamel binder have lubricating qualities.

Another object is to provide such a dry film lubricant of improved adherence in which at least half of the composition, by weight, is composed of the glass frit.

Still another object is to provide a method of applying such a lubricant on a bearing metal surface.

Other objects and advantages of the present invention will become apparent from the following detailed description and the appended claims.

In accordance with the present invention an improved dry film lubricant is provided comprising:

|  | Satisfactory, wt. percent | Preferred, wt. percent |
| --- | --- | --- |
| Glass frit | 50–80 | 55–70 |
| Graphite | 0–25 | 5–15 |
| Molybdenum disulfide | 10–50 | 15–30 |
| Lead sulfide | 0–50 |  |
| $C+MoS_2+PbS$ | 15–50 |  |
| Silver | 0–20 | 5–20 |
| Gold | 0–20 |  |
| Indium | 0–20 |  |
| $Ag+Au+In$ | 5–20 |  |

The glass frit is characterized chiefly by its large concentration of antimony oxide as compared with the conventional silica-base compositions for dry film lubricants. The $Sb_2O_3$ comprises at least about 50 weight percent of the glass composition. The glass frit, depending upon its particular formulation, begins to soften at a temperature of about 900° F. and is pourable at a temperature of about 1200° F. The composition of the glass frit is given below.

|  | Satisfactory, wt. percent | Preferred, wt. percent |
| --- | --- | --- |
| $Sb_2O_3$ | 50–80 | 60–68 |
| $B_2O_3$ | 1–10 | 3–10 |
| $Sb_2O_3+B_2O_3$ | 65–85 | 65–70 |
| $SiO_2$ | 0–8 | 2–6 |
| $As_2O_3$ | 0–30 | 0.5–15 |
| $ZnO$ | 0–10 | 0.5–1.5 |
| $PbO$ | 0–30 | 15–20 |
| $SiO_2+ZnO+PbO$ | 5–30 | 8–25 |
| $K_2O$ | 0–20 | 3–10 |
| $Na_2O$ | 0–10 | 0.5–3 |
| $Li_2O$ | 0–5 | 0.5–3 |
| $K_2O+Na_2O+Li_2O$ | 1–20 | 5–10 |

My present dry film lubricant systems provide extremely long wear life at low friction under high load conditions and at temperatures too high for use of organic binders, conventional grease-type lubricants, or some commercially available dry film lubricants. The lubricant is particularly characterized by the fact that the glass itself has lubricating qualities. It is used in the present invention in far greater concentrations, at least 50 weight percent, in comparison with the 10–20 weight percent of conventional dry film lubricants. The silver, indium, or gold addition serves as a smear metal and promotes self healing of the film. The present composition has superior adherence to the metal surface, greater high temperature stability, and reduced tendency for cracking or spalling. It also results in greatly improved lubricity over the same compositions containing less than 50 percent glass.

The dry film lubricant is prepared and applied in the following general manner. The glass frit is prepared in a conventional manner known to the ceramics art (melting together of components and quenching). The lubricant materials including the frit are then separately ground to a fine particle size, for example to pass a 100-mesh screen, mixed together in a suitable organic carrier, then applied to the wear surface by conventional methods such as brushing, dipping, or spraying. A thin, uniform film which is desirably about 0.5 mil is achieved. After drying, the coated parts are heated to an elevated temperature to fuse the glass and bond the coating to the wear area.

The ground and mixed glass lubricant composition may be satisfactorily applied onto a bearing surface in a slurry of a suitable aqueous or organic solvent. Relatively low molecular weight aliphatic or aromatic organic solvents are preferred. These may include alcohols, ketones and aldehydes, both aliphatic and aromatic, for example methanol, ethanol, propanol, methyl ethyl alcohol, methyl propyl alcohol, acetone, benzene, toluol, turpentine, and the like. Isopropyl alcohol is found to be particularly satisfactory. Sufficient solvent is used to form a consistent slurry which can be readily applied onto the metal surface. Generally, approximately 30 to 60 weight percent solvent is satisfactory, while about 40 weight percent is preferred.

The bearing surface is customarily cleaned before application of the lubricant composition, for example by grit blasting, vapor honing, acid pickling, or with an organic solvent. Bearing steels generally have a high alloy content, and frequently the surfaces are plated with chromium or the like. While the coating may be satisfactorily applied by any of the above conventional methods, it is found that dip coating is preferred and provides an efficient and reproducible method of applying the coating.

The thickness of the coating on the bearing surface can be changed by varying the specific gravity of the slurry with solvent, and by residence time in the bath.

After the bearing is coated, it is permitted to dry and is then fired at an elevated temperature in order to vitrify the glass frit and insure adherence of the thin film to the metal surface. The firing is conducted at a temperature of about 900–1100° F. for a period of 3 to 40 minutes in air, depending upon the mass of the part. Preferred firing conditions are about 950±25° F. for about 10 minutes. The firing time can be considerably reduced by using an air circulating furnace of high input (i.e., 18 kw. power input) to promote rapid recovery, and to limit heat losses during loading. To prevent any possible oxidation effects during firing on a metal surface such as copper or upon molybdenum disulfide, the firing of the coating may optionally be conducted in a non-oxidizing atmosphere.

The following examples are offered to illustrate my invention in greater detail.

*Example I*

A solid mixture of the following composition was formed by separately grinding the materials to pass a 100-mesh screen and then mixed together:

| | Wt. percent |
|---|---|
| Glass frit | 60 |
| Graphite | 6 |
| Molybdenum disulfide | 19 |
| Silver powder | 15 |

The glass frit was composed as follows:

| | Wt. percent |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 |

A thin slurry was formed of this coating mixture with isopropyl alcohol, the slurry comprising 40 weight percent isopropyl alcohol. A vapor honed plain bearing surface of chromium plated type H–11 low alloy carbon steel was dipped into this slurry to obtain a surface film of about 0.5 mil. The film was air dried, and the coated parts were then heated at a temperature of about 950° F. for 10 minutes in an air circulating furnace in order to fuse the glass and bond the coating to the bearing surface.

The lubricated bearing was given a wear life test under the following conditions:

| | | |
|---|---|---|
| Temperature | ° F. | 630 |
| Load | p.s.i. | 10,000 |
| Oscillation | plus or minus | 32° |
| Cycle rate | per min. | 10 |

The average wear life of a number of tested bearings prepared in the above manner was 32,000 cycles. For comparison purposes the same wear life test was run on several commercially available dry film lubricants containing such lubricant components as molybdenum disulfide and graphite, and generally containing 10–20 weight percent binder.

| Commercial lubricant | Type of binder | Average Wear life (cycles) |
|---|---|---|
| A | Sodium silicate | 4,500 |
| B | Potassium silicate | 3,000 |
| C | Lead borosilicate glass | 2,000 |
| D | ---do--- | 500 |
| E | ---do--- | 1,000 |
| F | Lead lithia borosilicate glass | 1,000 |
| G | ---do--- | 1,000 |
| H | Organic resin | 5,000 |

It is thus seen that the present dry film lubricant provides a factor of at least 6 greater wear life than the best commercially available dry film lubricants.

*Example II*

The procedure of Example I was followed with the following exceptions. The composition of the lubricant mixture was as follows:

| | Wt. percent |
|---|---|
| Glass frit | 65 |
| Graphite | 4 |
| Molybdenum disulfide | 21 |
| Silver powder | 10 |

The composition of the glass was as follows:

| | Wt. percent |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 |

The mixture was formed into a slurry with toluol. A steel plain bearing cleaned by grit blasting was dipped into the slurry to form a 0.6-mil film. The coated bearing was air dried and then fired in air at a temperature of about 950° F. for 10 minutes. A wear life test under the conditions of Example I gave 40,000 cycles before failure.

*Examples III to XII*

Dry film lubricants of the following compositions, by weight percent, were prepared and applied in the manner outlined in Example I.

| Example | III | IV | V | VI | VII | VIII | IX | X | XI | XII |
|---|---|---|---|---|---|---|---|---|---|---|
| Lubricant mixture: | | | | | | | | | | |
| Glass frit | 80 | 60 | 60 | 60 | 60 | 60 | 60 | 60 | 60 | 60 |
| Graphite | 3 | 6 | ---- | 6 | 6 | 6 | 6 | 6 | 6 | 6 |
| Molybdenum disulfide | 12 | 19 | 25 | 10 | 19 | 19 | 19 | 19 | 19 | 19 |
| Silver powder | 5 | 15 | 15 | 15 | 5 | ---- | ---- | 15 | 15 | 15 |
| Lead sulfide | ---- | ---- | ---- | 9 | ---- | ---- | ---- | ---- | ---- | ---- |
| Gold powder | ---- | ---- | ---- | ---- | 5 | 15 | ---- | ---- | ---- | ---- |
| Indium powder | ---- | ---- | ---- | ---- | 5 | ---- | 15 | ---- | ---- | ---- |
| Glass frit: | | | | | | | | | | |
| $Sb_2O_3$ | 65 | 60 | 60 | 60 | 65 | 65 | 65 | 62 | 63 | 63 |
| $B_2O_3$ | 5 | 5 | 5 | 5 | 5 | 5 | 5 | 5 | 5 | 5 |
| $SiO_2$ | 3 | 3 | 3 | 3 | 3 | 3 | 3 | 3 | 3 | 3 |
| PbO | 19 | 24 | 24 | 24 | 19 | 19 | 19 | 19 | 19 | 19 |
| $K_2O$ | 7 | 5 | 5 | 5 | 7 | 7 | 7 | 7 | 5 | 5 |
| $As_2O_3$ | 1 | 3 | 3 | 3 | 1 | 1 | 1 | 1 | 1 | 3 |
| ZnO | ---- | ---- | ---- | ---- | ---- | ---- | ---- | 1 | ---- | ---- |
| $Na_2O$ | ---- | ---- | ---- | ---- | ---- | ---- | ---- | ---- | 2 | 2 |
| $LiO_2$ | ---- | ---- | ---- | ---- | ---- | ---- | ---- | ---- | 2 | ---- |
| $Al_2O_3$ | ---- | ---- | ---- | ---- | ---- | ---- | ---- | ---- | 1 | ---- |
| BaO | ---- | ---- | ---- | ---- | ---- | ---- | ---- | 1 | ---- | ---- |

The above examples are illustrative rather than restrictive of my invention which should be understood to be limited only as is indicated in the following claims.

I claim:

1. A dry film lubricant composition comprising, by weight percent, approximately:

| | |
|---|---|
| Glass frit | 60 |
| Graphite | 6 |
| Molybdenum disulfide | 19 |
| Silver powder | 15 | wherein the glass frit comprises—

| | |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 |

2. A dry film lubricant composition comprising, by weight percent, approximately:

| | |
|---|---|
| Glass frit | 65 |
| Graphite | 4 |
| Molybdenum disulfide | 21 |
| Silver powder | 10 | wherein the glass frit comprises—

| | |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 |

3. A method of providing a dry film lubricant on a metal surface which comprises forming a lubricating mixture having approximately the following composition, by weight percent:

| | |
|---|---|
| Glass frit | 60 |
| Graphite | 6 |
| Molybdenum disulfide | 19 |
| Silver powder | 15 | wherein the composition of the glass frit is—

| | |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 | forming a slurry of the resulting mixture with a relatively low molecular weight organic solvent, applying said slurry onto said metal surface, drying the resulting coated surface, and then firing the resulting coated part at a temperature of about 900–1100° F. for about 3–40 minutes in order to vitrify the glass and cause adherence to the metal surface.

4. A method of providing a dry film lubricant on a metal surface which comprises forming a lubricating mixture having approximately the following composition, by weight percent:

| | |
|---|---|
| Glass frit | 65 |
| Graphite | 4 |
| Molybdenum disulfide | 21 |
| Silver powder | 10 | wherein the composition of the glass frit is—

| | |
|---|---|
| $Sb_2O_3$ | 65 |
| $B_2O_3$ | 5 |
| $SiO_2$ | 3 |
| PbO | 19 |
| $K_2O$ | 7 |
| $As_2O_3$ | 1 | forming a slurry of the resulting mixture with a relatively low molecular weight organic solvent, applying said slurry onto said metal surface, drying the resulting coated surface, and then firing the resulting coated part at a temperature of about 900–1100° F. for about 3–40 minutes in order to vitrify the glass and cause adherence to the metal surface.

5. The method of claim 3 wherein the firing is conducted at a temperature of about 950±25 F. for about 10 minutes in air.

6. The method of claim 3 wherein said organic solvent is isopropyl alcohol and the isopropyl alcohol comprises about 40 weight percent of the slurry.

7. A dry film lubricant composition comprising approximately, by weight percent:
 (A) (1) 50–80 of a glass frit,
 (2) 15–50 of at least one component selected from the class consisting of—
  (a) 10–50 molybdenum disulfide,
  (b) 0–25 graphite, and
  (c) 0–50 of lead sulfide, and
 (3) 5–20 of at least one component selected from the class consisting of—
  (a) 0–20 silver,
  (b) 0–20 gold, and
  (c) 0–20 indium; and
 (B) wherein said glass frit comprises approximately—
  (1) 65–85 of $Sb_2O_3+B_2O_3$, wherein
   (a) the $Sb_2O_3$ is 50–80, and
   (b) the $B_2O_3$ is 1–10,
  (2) 0–30 $As_2O_3$,
  (3) 5–30 of at least one component selected from the class consisting of—
   (a) 0–8 $SiO_2$,
   (b) 0–10 ZnO, and
   (c) 0–30 PbO, and
  (4) 1–20 of at least one component selected from the class consisting of—
   (a) 0–20 $K_2O$,
   (b) 0–10 $Na_2O$, and
   (c) 0–5 $Li_2O$.

8. A dry film lubricant composition comprising, by weight percent, approximately:
 (A) (1) glass frit 55–70
 (2) graphite 5–15
 (3) molybdenum disulfide 15–30, and
 (4) silver 5–20,
 (B) wherein said glass frit comprises—
  (1) 65–70 $Sb_2O_3+B_2O_3$ wherein
   (a) the $Sb_2O_3$ is 60–68, and
   (b) the $B_2O_3$ is 3–10
  (2) $As_2O_3$ 0.5–15
  (3) 8–25 of $SiO_2+ZnO+PbO$ wherein
   (a) the $SiO_2$ is 2–6
   (b) the ZnO is 0.5–1.5 and
   (c) the PbO is 15–20
  (4) 5–10 $K_2O+Na_2O+Li_2O$ wherein
   (a) the $K_2O$ is 3–10
   (b) the $Na_2O$ is 0.5–3.0 and
   (c) the $Li_2O$ is 0.5–3.0.

9. A method of providing a dry film lubricant on a metal surface which comprises forming a lubricating mixture having approximately the following composition, by weight percent:
 (A) (1) 50–80 of a glass frit,
 (2) 15–20 of at least one component selected from the class consisting of—
  (a) 10–50 molybdenum disulfide,
  (b) 0–25 graphite, and
  (c) 0–50 of lead sulfide, and
 (3) 5–20 of at least one component selected from the class consisting of—
  (a) 0–20 silver,
  (b) 0–20 gold, and
  (c) 0–20 indium; and
 (B) wherein said glass frit comprises approximately—
  (1) 65–85 of $Sb_2O_3+B_2O_3$, wherein
   (a) the $Sb_2O_3$ is 50–80 and
   (b) the $B_2O_3$ is 1–10,
  (2) 0–30 $As_2O_3$,
  (3) 5–30 of at least one component selected from the class consisting of—
   (a) 0–8 $SiO_2$,
   (b) 0–10 ZnO, and
   (c) 0–30 PbO, and
  (4) 1–20 of at least one component selected from the class consisting of—
   (a) 0–20 $K_2O$,
   (b) 0–10 $Na_2O$, and
   (c) 0–5 $Li_2O$,
    forming a slurry of the resulting mixture with an organic solvent,
    applying said slurry onto said metal surface,
    drying the resulting coated surface,
    and then firing the resulting coated part at a temperature of about 900–1100° F. in order to vitrify the glass and cause adherence to the metal surface.

10. A method of providing a dry film lubricant on a metal surface which comprises forming a lubricating mixture having approximately the following composition, by weight percent:
(A) (1) glass frit 55–70
(2) graphite 5–15
(3) molybdenum disulfide 15–30, and
(4) silver 5–20,
(B) wherein said glass frit comprises—
(1) 65–70 $Sb_2O_3+B_2O_3$ wherein
(a) the $Sb_2O_3$ is 60–68, and
(b) the $B_2O_3$ is 3–10
(2) $As_2O_3$ 0.5–15.0
(3) 8–25 of $SiO_2+ZnO2PbO$ wherein
(a) the $SiO_2$ is 2–6
(b) the ZnO is 0.5–1.5 and
(c) the PbO is 15–20
(4) 5–10 $K_2O+Na_2O+Li_2O$ wherein
(a) the $K_2O$ is 3–10
(b) the $Na_2O$ is 0.5–3.0, and
(c) the $Li_2O$ is 0.5–3.0,
forming a slurry of the resulting mixture with an organic solvent,
applying said slurry onto said metal surface,
drying the resulting coated surface,
and then firing the resulting coated part at a temperature of about 900–1100° F. in order to vitrify the glass and cause adherence to the metal surface.

References Cited by the Examiner

UNITED STATES PATENTS

| | | | |
|---|---|---|---|
| 2,700,623 | 1/1955 | Hall | 252—12 |
| 2,970,927 | 2/1961 | David | 252—26 |
| 3,051,586 | 8/1962 | Heath et al. | 252—26 |
| 3,089,849 | 5/1963 | Linson | 252—29 |
| 3,161,595 | 12/1964 | Fenker | 252—28 |

DANIEL E. WYMAN, *Primary Examiner.*

I. VAUGHN, *Assistant Examiner.*